(12) United States Patent
Kuchler et al.

(10) Patent No.: US 10,239,383 B2
(45) Date of Patent: Mar. 26, 2019

(54) VEHICLE HAVING AN INTERNAL COMBUSTION ENGINE AND A WASTE-HEAT-COLLECTING HOUSING, METHOD FOR USING PART OF THE HEAT GIVEN OFF BY AN INTERNAL COMBUSTION ENGINE, AND STATIONARY ASSEMBLY, IN PARTICULAR BLOCK-TYPE THERMAL POWER STATION

(71) Applicant: Bayerische Motoren Werke Aktiengesellschaft, Munich (DE)

(72) Inventors: Maximilian Kuchler, Munich (DE); Carsten Spengler, Munich (DE); Ivo Weese, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 138 days.

(21) Appl. No.: 15/230,521

(22) Filed: Aug. 8, 2016

(65) Prior Publication Data
US 2016/0339763 A1   Nov. 24, 2016

Related U.S. Application Data

(63) Continuation of application No. PCT/EP2015/060008, filed on May 7, 2015.

(30) Foreign Application Priority Data

May 16, 2014  (DE) .......................... 10 2014 209 274

(51) Int. Cl.
*F01N 3/00*     (2006.01)
*B60H 1/18*    (2006.01)
(Continued)

(52) U.S. Cl.
CPC ................. *B60H 1/18* (2013.01); *B60H 1/20* (2013.01); *F01M 5/001* (2013.01); *F01N 5/02* (2013.01);
(Continued)

(58) Field of Classification Search
CPC .......... B60H 1/20; F01M 5/001; F01N 13/10; F01N 2260/022; F01N 5/02; Y02T 10/16
See application file for complete search history.

(56) References Cited

U.S. PATENT DOCUMENTS 1,418,208 A    5/1922  Shotwell
1,428,299 A    9/1922  Rogers
(Continued)

FOREIGN PATENT DOCUMENTS

CH    283289       9/1952
CN    2596031 Y   12/2003
(Continued)

OTHER PUBLICATIONS

FR 2719810 A1 English Translation Provided.*
(Continued)

*Primary Examiner* — Audrey K Bradley
*Assistant Examiner* — Anthony Ayala Delgado
(74) *Attorney, Agent, or Firm* — Crowell & Moring LLP

(57) ABSTRACT

A device and to a method are provided for using part of the heat given off by an internal combustion engine. A waste-heat-collecting housing surrounds at least part of an exhaust-gas manifold and/or at least part of an engine-side segment of an exhaust-gas system of the internal combustion engine. Air contained in the waste-heat-collecting housing is heated, and the heated air is used indirectly or directly to heat at least one of air that is introduced in a passenger compartment of the vehicle, cooling liquid of the internal combustion engine and oil in an oil circuit of the internal combustion engine.

(Continued)

The waste-heat-collecting housing is similarly useable in a stationary apparatus having an internal combustion engine.

15 Claims, 3 Drawing Sheets

(51) Int. Cl.
  *B60H 1/20* (2006.01)
  *F01N 5/02* (2006.01)
  *F01N 13/10* (2010.01)
  *F01M 5/00* (2006.01)

(52) U.S. Cl.
  CPC ........ *F01N 13/10* (2013.01); *F01N 2260/022* (2013.01); *F01P 2060/16* (2013.01); *Y02E 20/14* (2013.01); *Y02T 10/16* (2013.01)

(56) References Cited

U.S. PATENT DOCUMENTS

| | | | |
|---|---|---|---|
| 6,341,814 | B1 | 1/2002 | Hoenninger et al. |
| 7,448,368 | B2 * | 11/2008 | Freese .................... F02M 26/07 123/568.12 |
| 2011/0067389 | A1 | 3/2011 | Prior et al. |
| 2016/0250908 | A1 * | 9/2016 | Nakashima ............ B60H 1/025 165/51 |

FOREIGN PATENT DOCUMENTS

| | | |
|---|---|---|
| CN | 103528260 A | 1/2014 |
| DE | 1092788 B | 11/1960 |
| DE | 28 54 473 A1 | 6/1980 |
| DE | 3334435 A1 | 4/1985 |
| DE | 199 08 497 A1 | 9/2000 |
| DE | 20 2005 015 496 U1 | 12/2005 |
| DE | 20 2009 006 294 U1 | 9/2009 |
| DE | 10 2009 032 566 A1 | 1/2011 |
| DE | 10 2010 046 151 A1 | 2/2012 |
| DE | 10 2011 018 382 A1 | 10/2012 |
| EP | 1 162 094 A1 | 12/2001 |
| FR | 2719810 A1 * 11/1995 ............ B60H 1/025 |
| GB | 435173 A | 9/1935 |

OTHER PUBLICATIONS

Chinese-language Office Action issued in counterpart Chinese Application No. 201580008326.1 dated Jul. 3, 2017 with English translation (Seventeen (17) pages).
German-language Office Action issued in counterpart German Application No. DE 10 2014 209 274.4 dated Apr. 9, 2015(5 pages).
International Search Report (PCT/ISA/210) issued in PCT Application No. PCT/EP2015/060008 dated Aug. 3, 2015 with English translation (6 pages).
German-language Written Opinion (PCT/ISA/237) issued in PCT Application No. PCT/EP2015/060008 dated Aug. 3, 2015 (6 pages).

* cited by examiner

VEHICLE HAVING AN INTERNAL COMBUSTION ENGINE AND A WASTE-HEAT-COLLECTING HOUSING, METHOD FOR USING PART OF THE HEAT GIVEN OFF BY AN INTERNAL COMBUSTION ENGINE, AND STATIONARY ASSEMBLY, IN PARTICULAR BLOCK-TYPE THERMAL POWER STATION

CROSS REFERENCE TO RELATED APPLICATIONS

This application is a continuation of PCT International Application No. PCT/EP2015/060008, filed May 7, 2015, which claims priority under 35 U.S.C. § 119 from German Patent Application No. 10 2014 209 274.4, filed May 16, 2014, the entire disclosures of which are herein expressly incorporated by reference.

BACKGROUND AND SUMMARY OF THE INVENTION

The present invention concerns a vehicle having an internal combustion engine and a waste heat collecting housing.

It is already known how to utilize the heat contained in the exhaust gas of an internal combustion engine. In this context, refer to German patent documents no. DE 10 2009 032 566 A1, which describes a vehicle with an exhaust gas heat exchanger. An exhaust gas heat exchanger is a heat exchanger with a flow of hot exhaust gas on one side and coolant of an internal combustion engine on the other side. The exhaust gas heat exchanger makes possible a partial "heat recovery," i.e., a transfer of heat from the hot exhaust gas to the coolant of the internal combustion engine. By use of an exhaust gas heat exchanger, the warm-up phase of the internal combustion engine can be shortened. Many vehicles intended for so-called "cold countries" are outfitted with exhaust gas heat exchangers in order to accomplish some degree of heating support. The drawback of exhaust gas heat exchangers is, among others, that they alter the exhaust gas counterpressure as compared to exhaust gas systems with no exhaust gas heat exchangers and there needs to be a constant "heat pickup," i.e., the exhaust gas heat exchanger has to be constantly cooled in order to prevent overheating.

The problem which the invention solves is to create a vehicle and a stationary assembly in which the heat given off by an internal combustion engine can be utilized in another manner, i.e., not through an exhaust gas heat exchanger. Moreover, the invention provides a corresponding method for the utilization of part of the heat given off by an internal combustion engine.

Although the invention is described below primarily in connection with a vehicle, it is expressly noted that the invention is not confined to the application in or in connection with vehicles, but can also be employed in "stationary" manner, i.e. in a positionally fixed manner, e.g., in connection with a block-type thermal power station.

The starting point of the invention is a vehicle with an internal combustion engine and an exhaust gas manifold, through which hot exhaust gas coming from the internal combustion engine is introduced into an "engine-side section" of an exhaust gas system. The term "engine-side section" of the exhaust gas system encompasses in particular the section between the exhaust gas manifold and a section of the exhaust gas system adjoining the engine-side section and running in the subfloor region of the vehicle.

The crux of the invention is that a "waste heat collecting housing" which surrounds or encloses at least part of the exhaust gas manifold and/or part of an engine-side section of the exhaust gas system is used to heat the air present in the waste heat collecting housing. The term "waste heat collecting housing" should be interpreted broadly. It is not necessarily confined to a "housing", but instead should be interpreted quite generally in the sense of an air guiding element.

Thanks to the waste heat collecting housing, at least a part of the exhaust gas manifold and/or a part of an engine-side section of the exhaust gas system is thermally and acoustically "encapsulated". This dual function (thermal and acoustic encapsulation) is a major benefit of the invention, since the soundproofing expense (e.g., soundproofing of the front wall separating the engine compartment from the passenger compartment) can be decreased in this way.

Preferably, however, the exhaust gas manifold and/or part of an engine-side section of the exhaust gas system are encapsulated as completely as possible by the waste heat collecting housing, since this improves the efficiency of the overall system.

Another benefit of the invention is that it does not require an "intervention" in the exhaust gas system, i.e., the exhaust gas system does not need to be changed.

The heat transfer from the exhaust gas manifold and/or the engine-side section of the exhaust gas system to the air present in the waste heat collecting housing occurs primarily through thermal radiation and convection. Thus, according to the invention, the engine waste heat is utilized directly at the so-called "hot end," i.e., at the exhaust gas manifold and/or the section of the exhaust gas system near the engine. The "hot end" constitutes the most direct and productive, i.e., most effective "access" to the engine waste heat. With the waste heat collecting housing according to the invention, a systematic encapsulation of the hot end is accomplished. The hot end is the strongest heat radiator in the engine space of a vehicle with internal combustion engine. A direct heat removal from the hot end also has various benefits in terms of the technical operating safety in the engine space.

According to the invention, the air heated in the waste heat collecting housing is utilized to heat air to be taken into a passenger compartment of the vehicle and/or
  to heat cooling fluid of the internal combustion engine and/or
  to heat engine oil of the internal combustion engine and/or
  to (merely) remove heat from the engine space, wherein in the latter case the heated air coming from the waste heat collecting housing is taken into the surroundings.

According to one modification of the invention, an air/air heat exchanger is provided by which heat from the air heated in the waste heat collecting housing can be transferred to the air to be taken into a passenger compartment of the vehicle. Thus, the engine waste heat "recovered" via the waste heat collecting housing can be used to heat the air of the passenger compartment. The air/air heat exchanger can be arranged directly in the so-called climate module or climate device of the vehicle, i.e., on the side of the front wall (partition wall between the passenger compartment and the engine space) facing the passenger compartment. By use of such an air/air heat exchanger, a relatively spontaneously responding heating system can be provided or the heating power provided by the cooling system of the internal combustion engine can be enhanced, which is especially advantageous for so-called "cold country vehicles". Such an air/air heat exchanger as a support for the heating system is also of advantage for modern Diesel vehicles, which put out relatively little heat through the cooling system as compared to vehicles with gasoline engines.

Alternatively or in addition to an air/air heat exchanger, an air/coolant heat exchanger can be provided, by which heat from the air heated in the waste heat collecting housing can be transferred to a coolant of a cooling circuit of the internal combustion engine. By use of such an air/coolant heat exchanger, a transfer of heat from the hot end region of the internal combustion engine to the coolant of the internal combustion engine is possible, which substantially shortens the warm-up phase of the internal combustion engine and has favorable impact on the pollutant emission.

Alternatively or in addition to an air/air heat exchanger or an air/coolant heat exchanger, an air/oil heat exchanger can be provided, by which heat from the air heated in the waste heat collecting housing can be transferred to oil of an oil circuit of the internal combustion engine, i.e., to the engine oil of the internal combustion engine. In this way as well, the warm-up phase of the internal combustion engine can be shortened by recovery of heat from the hot end region.

Since the waste heat collecting housing encloses at least part of the manifold or the entire exhaust manifold and/or part of the engine-side section or a section of the exhaust gas system near the engine, the waste heat collecting housing also works as a muffler. Thus, the hot end region is to a certain extent acoustically encapsulated by the waste heat collecting housing. The thus far customary and necessary soundproofing measures therefore become at least in part obsolete. It is of advantage when the waste heat collecting housing is coated or lined with an appropriately temperature-resistant soundproofing layer.

According to one modification of the invention, at least one catalyst of the exhaust gas system is arranged inside the waste heat collecting housing. The catalyst can be, e.g., a NOx storage catalyst, a SCR (selective catalytic reduction) catalyst, or the like.

Alternatively or in addition to this, it can be provided that an exhaust gas turbocharger or at least a turbine-side region of the exhaust gas turbocharger is arranged inside the waste heat collecting housing.

The engine-side section of the exhaust gas system or a section near the engine is connected to a section of the exhaust gas system running in a subfloor region of the vehicle. The engine-side section or the section of the exhaust gas system near the engine is that section of the exhaust gas system which extends between the exhaust gas manifold and the subfloor region of the vehicle. It can be provided that the waste heat collecting housing extends over the entire length of the engine-side section or the section of the exhaust gas system near the engine. In other words, it can be provided that the waste heat collecting housing extends up to the section of the exhaust gas system running in the subfloor region of the vehicle.

For thermal reasons, it can be provided that the waste heat collecting housing is at least partly made, especially for the most part made, of sheet metal. Alternatively to this, the waste heat collecting housing can also be made from a sufficiently temperature-resistant plastic material.

According to one modification of the invention, the waste heat collecting housing has an air inlet through which air from the surroundings or from an engine space of the vehicle can flow into the waste heat collecting housing. The air located in the engine space, after reaching the operating temperature of the internal combustion engine, is warmer than the surrounding air and after flowing into the waste heat collecting housing from the hot end (i.e., from the exhaust gas manifold and/or the engine-side section of the exhaust gas system or the section near the engine) is further heated.

According to one modification of the invention, the waste heat collecting housing has a first air outlet for heated air. It can be provided that the first air outlet stands in fluidic connection with the air/air heat exchanger and/or the air/coolant heat exchanger and/or the air/oil heat exchanger.

According to one modification of the invention, the waste heat collecting housing has a second air outlet by which air heated in the waste heat collecting housing can bypass the first air outlet and be taken directly (unused) to the surroundings. This makes sense when there is no need to transfer heat via an air/air heat exchanger to the air to be introduced into the passenger compartment or when there is no need to introduce recovered heat into the coolant or the engine oil of the internal combustion engine. Thus, by the second air outlet heat can be removed directly from the engine space (thereby improving the thermal operating safety) without furnishing heat to the coolant or to the engine oil of the internal combustion engine or air to the passenger compartment. The air flowing from the waste heat collecting housing across the second air outlet can be diverted directly downward from the vehicle in the direction of the roadway. The operating mode of "heat removal from engine space" could be the preferred application of the invention for many or most of the operating states of a vehicle.

Moreover, a blower can be provided, which generates an air flow in the waste heat collecting housing directed toward the first and/or the second air outlet. In other words, by use of such a blower air is sucked in through the air inlet of the waste heat collecting housing or air is blown in through the air inlet. As already indicated, the air from the surroundings or from the engine space of the vehicle can be sucked or blown into the waste heat collecting housing. The blower can be arranged inside the waste heat collecting housing. Alternatively, it can also be arranged in the region of the air inlet.

According to one modification of the invention, the air heated in the waste heat collecting housing and taken through the air/air heat exchanger and/or the air/coolant heat exchanger and/or the air/oil heat exchanger and thereby cooled is taken away to the surroundings through an air exhaust duct.

According to one modification of the invention, a valve or gate arrangement controllable by actuators is provided, whereby in dependence on the position of the valve or gate arrangement the entire air flow coming from the waste heat collecting housing flows away through the first air outlet and the air/air heat exchanger and/or the air/coolant heat exchanger and/or the air/oil heat exchanger, or the entire heated air flow coming from the waste heat collecting housing bypasses the first air outlet and is diverted (unused) into the surroundings, or a first partial volume flow of the heated air flow coming from the waste heat collecting housing flows away through the first air outlet and a second partial volume flow of the heated air flow coming from the waste heat collecting housing bypasses the first air outlet and flows away (unused) into the surroundings.

The actuators and/or the valve or gate arrangement need not be in direct thermal connection with the exhaust gas system, which simplifies the thermal design of the actuators and the valve or gate arrangement.

It makes sense to convey the entire air flow coming from the waste heat collecting housing across the first air outlet when the recovered heat is to be used for heating the passenger compartment air and/or the coolant and/or the engine oil of the internal combustion engine. It makes sense to convey the entire air flow coming from the waste heat collecting housing directly into the surroundings, bypassing the first air outlet, when there is no need to heat the passenger compartment air or the coolant or the engine oil of the internal combustion engine and heat is to be removed from the engine space.

The above-described "mixed mode" (third bullet point) can make sense when both heat needs to be removed from the engine space and the passenger compartment air and/or the coolant of the internal combustion engine and/or the engine oil of the internal combustion engine need to be heated.

According to one modification of the invention, the actuators which control the valve or gate arrangement can have an electrical servo drive.

Moreover, it can be provided that the valve or gate arrangement has a non-activated base position in which the entire air flow coming from the waste heat collecting housing bypasses the first air outlet and is conveyed to the surroundings. For example, the valve or gate arrangement can be biased in the non-activated base position by a spring arrangement. This ensures that the valve or gate arrangement transitions into the non-activated base position upon interference or failure of the actuators.

As already mentioned in the introduction, the subject matter of the invention is not only a vehicle with an internal combustion engine and a waste heat collecting housing, but also a corresponding method for utilizing a portion of the heat given off by an internal combustion engine, wherein the air contained in a waste heat collecting housing is heated by means of the waste heat collecting housing, which encloses at least a portion of an exhaust gas manifold and/or at least a portion of an engine-side section of an exhaust gas system of the internal combustion engine, and the heated air is used directly or indirectly for the heating of air being taken into the passenger compartment of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
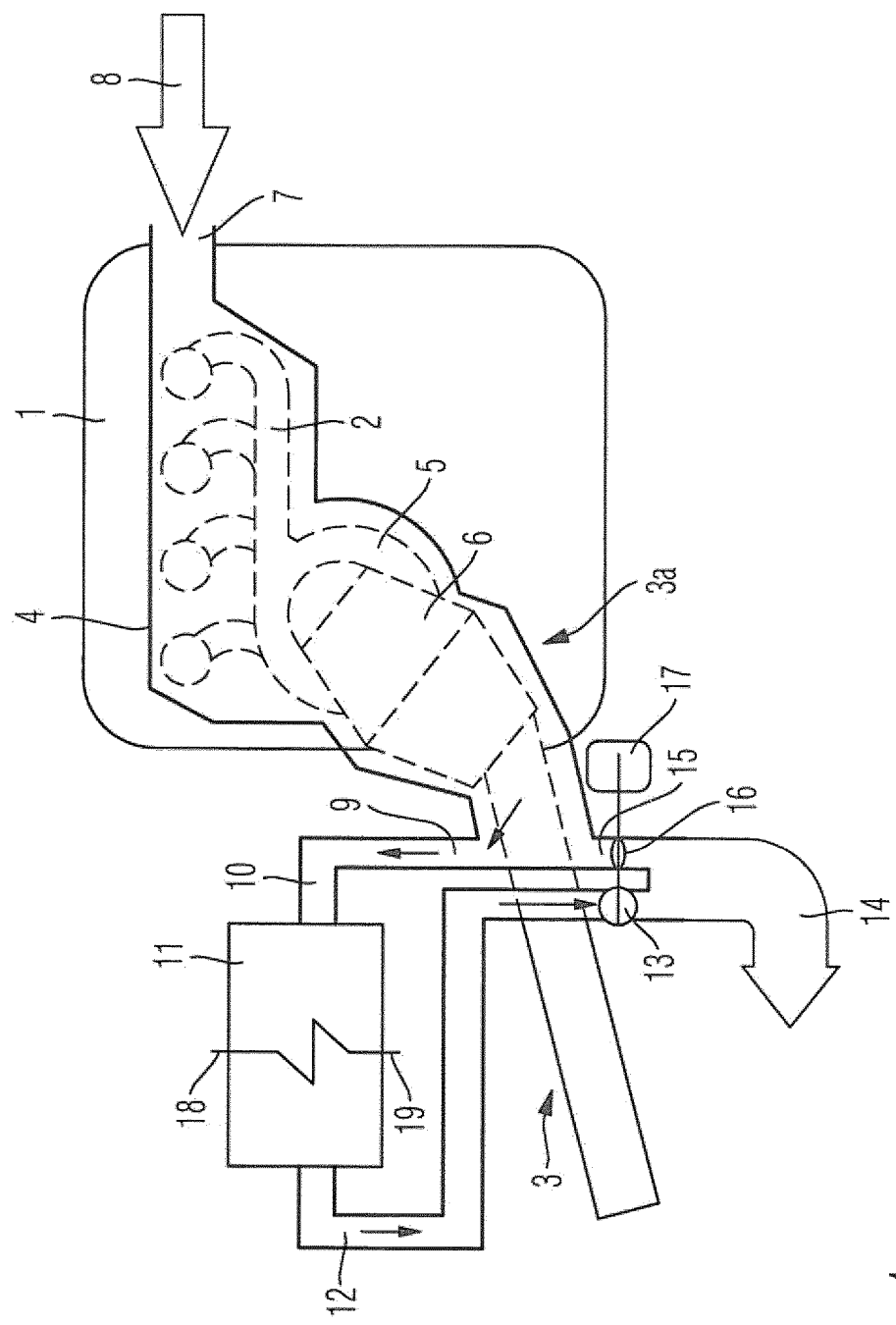
FIG. 1 shows the basic principle of an embodiment of the present invention in schematic representation in the "engine warm-up" state.

FIG. 1 shows an internal combustion engine 1 of a vehicle not otherwise represented here. An exhaust gas manifold 2 is flanged onto the internal combustion engine 1. Through the exhaust gas manifold 2, exhaust gas coming from the individual cylinders of the internal combustion engine 1 is introduced into an exhaust gas system 3.

In the embodiment shown in FIG. 1, the entire exhaust gas manifold 2 and an engine-side section 3a of the exhaust gas system 3 are surrounded by a waste heat collecting housing 4. Thus, the exhaust gas manifold 2 and the engine-side section or a section near the engine 3a of the exhaust gas system 3 are encapsulated by the waste heat collecting housing 4. The exhaust gas manifold 2 and the engine-side section or a section near the engine 3a of the exhaust gas system 3 are also called the "hot end." An exhaust gas turbocharger 5 and an exhaust gas catalyst 6 are arranged in the engine-side section 3a of the exhaust gas system 3.

Both the exhaust gas manifold 2 and the exhaust gas turbocharger 5 and catalyst 6 reach temperatures of several hundred degrees Celsius (up to 750° C.) in the operation of the internal combustion engine. In this way, the air present in the waste heat collecting housing 4 is greatly heated.

The waste heat collecting housing 4 has an air inlet 7, through which air from an engine space of the vehicle can flow into the waste heat collecting housing 4, as indicated by an arrow 8.

Moreover, the waste heat collecting housing 4 has a first air outlet 9. Through the first air outlet 9 and an air duct 10, air heated in the waste heat collecting housing 4 can flow through an air/coolant heat exchanger 11. With the air/coolant heat exchanger, there is a thermal coupling to a coolant circuit of the internal combustion engine, not otherwise represented here. Coolant flows in across a port 18. Heated coolant flows away across a port 19. After the heat is surrendered to the coolant, cooled air is taken away by an exhaust air duct 12 and an exhaust air gate 13 to the surroundings, as symbolized by an arrow 14.

The waste heat collecting housing 4 moreover has a second air outlet 15 and an exhaust air gate 16 interacting with it, which is closed in the position shown in FIG. 1. Thus, in the position shown in FIG. 1, the entire hot air flow flowing out from the waste heat collecting housing 4 is taken across the air/coolant heat exchanger 11 to the surroundings, whereupon heat is stored in the coolant of the internal combustion engine.

Figure 3:
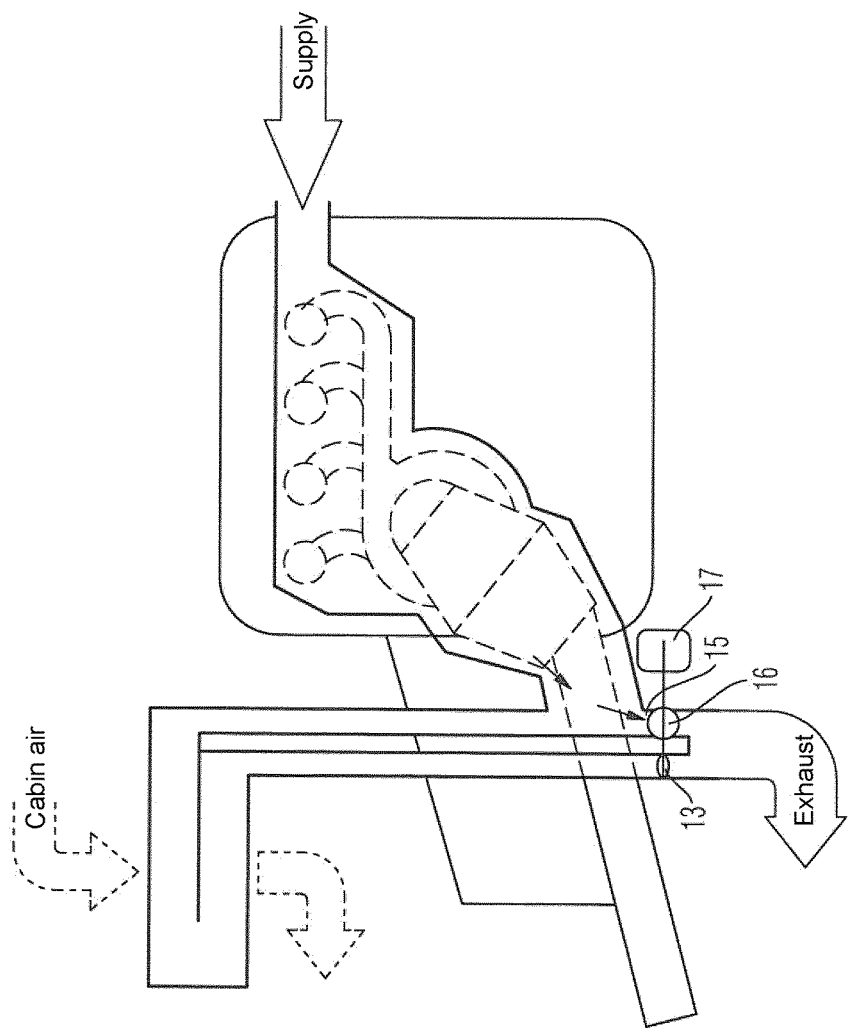
FIG. 3 shows the FIG. 1 system in the "engine space heat removal" state.

The gate arrangement formed by the two exhaust air gates 13, 16 can be swiveled by an actuator 17. The actuator 17 can be an electric motor, for example. By the swiveling of the exhaust air gates 13, 16, the exhaust air duct 12 can be closed and the second air outlet 15 opened. In this case, the entire air heated in the waste heat collecting housing 4 would flow directly across the second air outlet 15 into the surroundings, as is shown in FIG. 3. FIG. 3 thus shows the "engine space heat removal" operating state.

Figure 2:
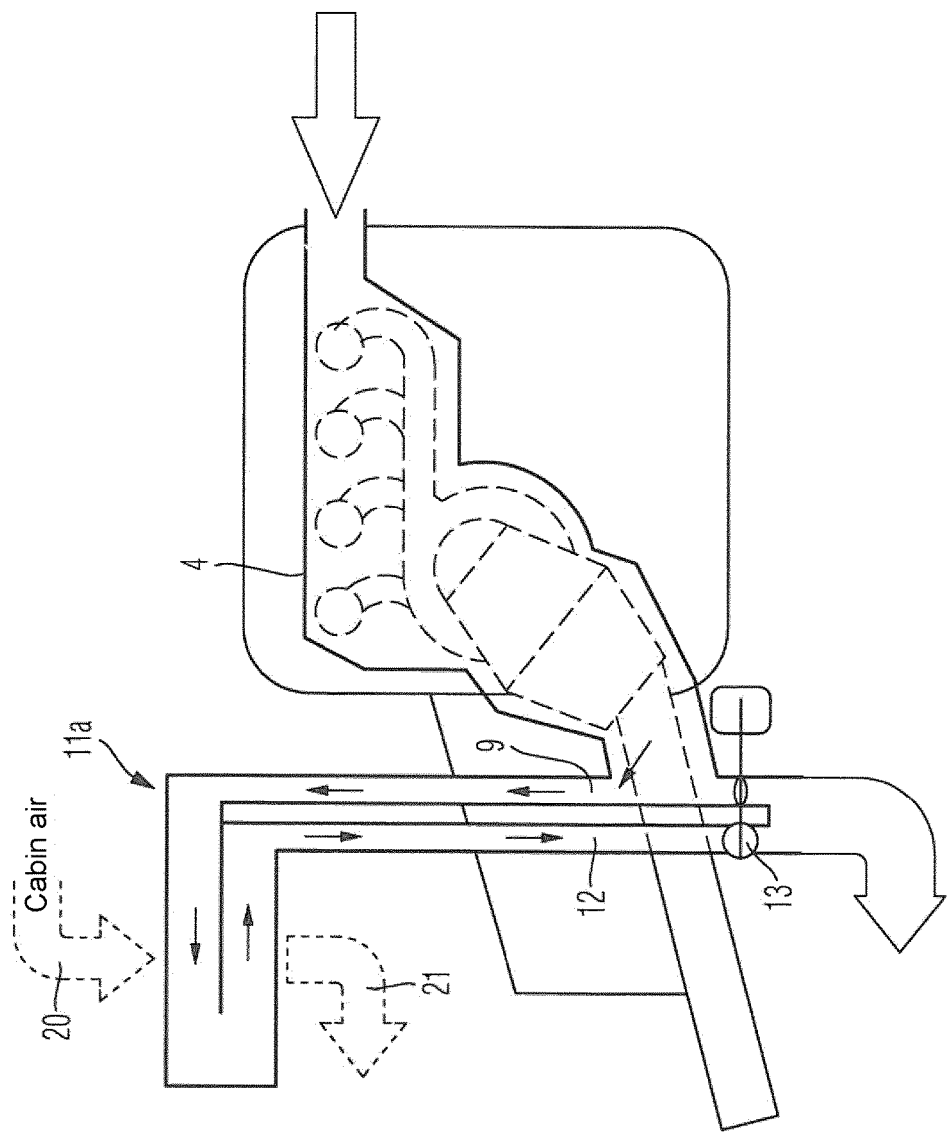
FIG. 2 shows the system in the "vehicle interior heating" state.

FIG. 2 shows the "vehicle interior heating" operating state. In this operating state, air heated in the waste heat collecting housing 4 flows across the first air outlet 9 into an air/air heat exchanger 11a. The air/air heat exchanger 11a receives both the flow of heated air coming from the waste heat collecting housing 4 and the flow of air 20 which is going to be heated. In the air/air heat exchanger 11a the air 20 is heated, as shown by the arrow 21. The heated air is then blown into the passenger compartment of the vehicle. The air from which the heat has been removed in the air/air heat exchanger 11a is taken across the exhaust air duct 12 and the exhaust air gate 13 to the surroundings.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A vehicle, comprising:
an internal combustion engine;

an exhaust manifold configured to conduct exhaust gas from the internal combustion engine into an engine-side portion of an exhaust system; and
a waste-heat collecting housing,
wherein
the waste-heat collecting housing is arranged to at least partially surround at least one of the exhaust manifold and the engine-side portion of the exhaust system, such that air in the waste-heat collecting housing is heatable by waste heat from the at least one of the exhaust manifold and the engine-side portion of the exhaust system,
the waste heat collecting housing has an air inlet configured to receive air to be heated in the waste heat collecting housing,
the waste heat collecting housing has an exhaust air duct configured to release the air heated in the waste heat collecting housing from the waste-heat collecting housing, the exhaust air duct being downstream of at least one of
an air/air heat exchanger configured to transfer heat from the air heated in the waste heat collecting housing to air for a passenger compartment of the vehicle,
an air/coolant heat exchanger configured to transfer heat from the air heated in the waste heat collecting housing to a coolant of a cooling circuit of the internal combustion engine, and
an air/oil heat exchanger configured to transfer heat from the air heating in the waste heat collecting housing to oil of an oil circuit of the internal combustion engine, and
the waste heat collecting housing has an air outlet configured to permit air heated in the waste heat collecting housing to bypass the exhaust air duct and released from the waste heat collecting housing without passing through the at least one of air/air, air/coolant and air/oil heat exchangers.

2. The vehicle as claimed in claim 1, wherein
the waste-heat collecting housing is arranged such that the air heated in the waste heat collecting housing is usable to at least one of
heat air for a passenger compartment of the vehicle,
heat cooling fluid of the internal combustion engine,
heat engine oil of the internal combustion engine, and
remove heat from an engine space of the vehicle.

3. The vehicle as claimed in claim 1, further comprising:
at least one catalyst of the exhaust gas system arranged inside the waste heat collecting housing.

4. The vehicle as claimed in claim 1, wherein
at least a turbine-side region of an exhaust gas turbocharger is arranged inside the waste heat collecting housing.

5. The vehicle as claimed in claim 1, wherein
the engine-side section of the exhaust gas system is connected to a section of the exhaust gas system located in a subfloor region of the vehicle, and
the waste heat collecting housing extends over an entire length of the engine-side section of the exhaust gas system.

6. The vehicle as claimed in claim 5, wherein
the waste heat collecting housing further extends up to the section of the exhaust gas system located in the subfloor region of the vehicle.

7. The vehicle as claimed in claim 1, wherein
the waste-heat collecting housing is at least partially composed of a metal sheet.

8. The vehicle as claimed in claim 1, further comprising:
a blower arranged to produce an air flow in the waste-heat collecting housing toward at least one of the exhaust air duct and the air outlet.

9. The vehicle as claimed in claim 8, wherein
the air heated in the waste-heat collecting housing that has transferred heat to the at least one of air/air, air/coolant and air/oil heat exchangers is removable via an exhaust air duct to the environment.

10. The vehicle as claimed in claim 9, further comprising:
at least one valve arranged to be controlled by at least one valve actuator,
wherein the valve is controllable to be positioned such that
all of the aft from the waste-heat collecting housing is conducted via the exhaust air duct and the heat accumulator to the environment,
all of the aft from the waste-heat collecting housing bypasses the exhaust air duct and the heat accumulator and is conducted to the environment, or
a first partial volumetric flow of the air from the waste-heat collecting housing is conducted via the exhaust air duct and the heat accumulator to the environment, and a second partial volumetric flow of the air from the waste-heat collecting housing bypasses the exhaust air duct and the heat accumulator and is conducted to the environment.

11. The vehicle as claimed in claim 10, wherein
the at least one valve actuator has an electric actuator.

12. The vehicle as claimed in claim 10, wherein
the valve the flap has an unactuated basic position in which the all of the air from the waste-heat collecting housing bypasses the first air outlet and the heat accumulator and is conducted to the environment.

13. The vehicle as claimed in claim 12, wherein
the internal combustion engine is a Diesel engine or a gasoline engine.

14. A method for recovery of heat from an internal combustion engine, comprising the acts of:
receiving air into a waste-heat collecting housing surrounding at least part of at least one of an exhaust manifold and an engine-side portion of an exhaust system of the internal combustion engine;
heating the aft received in the waste-heat collecting housing by waste heat released from the at least one of an exhaust manifold and an engine-side portion of an exhaust system of the internal combustion engine; and
transferring heat from the heated air to a passenger compartment of the vehicle,
wherein
the waste heat collecting housing has an air inlet configured to receive air to be heated in the waste heat collecting housing,
the waste heat collecting housing has an exhaust air duct configured to release the air heated in the waste heat collecting housing from the waste-heat collecting housing, the exhaust air duct being downstream of at least one of
an air/air heat exchanger configured to transfer heat from the air heated in the waste heat collecting housing to air for a passenger compartment of the vehicle,
an air/coolant heat exchanger configured to transfer heat from the air heated in the waste heat collecting housing to a coolant of a cooling circuit of the internal combustion engine, and an air/oil heat exchanger configured to transfer heat from the air heating in the waste heat collecting housing to oil of an oil circuit of the internal combustion engine, and the waste heat collecting housing has an air outlet configured to permit air heated in the waste heat collecting housing to bypass the exhaust air duct and released from the waste heat collecting housing without passing through the at least one of air/air, air/coolant and air/oil heat exchangers.

15. A stationary thermal power station, comprising:

an internal combustion engine;

an exhaust manifold configured to conduct exhaust gas from the internal combustion engine into an engine-side portion of an exhaust system; and a waste-heat collecting housing, wherein the waste-heat collecting housing is arranged to at least partially surround at least one of the exhaust manifold and the engine-side portion of the exhaust system, such that air in the waste-heat collecting housing is heatable by waste heat from the at least one of the exhaust manifold and the engine-side portion of the exhaust system, the waste heat collecting housing has an air inlet configured to receive air to be heated in the waste heat collecting housing, the waste heat collecting housing has an exhaust air duct configured to release the air heated in the waste heat collecting housing from the waste-heat collecting housing, the exhaust air duct being downstream of at least one of an air/air heat exchanger configured to transfer heat from the air heated in the waste heat collecting housing to air for a passenger compartment of the vehicle, an air/coolant heat exchanger configured to transfer heat from the air heated in the waste heat collecting housing to a coolant of a cooling circuit of the internal combustion engine, and an air/oil heat exchanger configured to transfer heat from the aft heating in the waste heat collecting housing to oil of an oil circuit of the internal combustion engine, and the waste heat collecting housing has an air outlet configured to permit air heated in the waste heat collecting housing to bypass the exhaust air duct and released from the waste heat collecting housing without passing through the at least one of air/air, air/coolant and air/oil heat exchangers.

* * * * *